(12) United States Patent
Leitz et al.

(10) Patent No.: US 12,138,686 B2
(45) Date of Patent: Nov. 12, 2024

(54) ADDITIVELY MANUFACTURED REFRACTORY METAL COMPONENT, ADDITIVE MANUFACTURING PROCESS AND POWDER

(71) Applicant: PLANSEE SE, Reutte (AT)

(72) Inventors: Karl-Heinz Leitz, Reutte (AT); Heinrich Kestler, Reutte (AT); Peter Singer, Reutte (AT); Gerhard Leichtfried, Innsbruck (AT); Jakob Braun, Innsbruck (AT); Lukas Kaserer, Innsbruck (AT); Janko Stajkovic, Innsbruck (AT)

(73) Assignee: Plansee SE, Reutte (AT)

( * ) Notice: Subject to any disclaimer, the term of this patent is extended or adjusted under 35 U.S.C. 154(b) by 298 days.

(21) Appl. No.: 17/294,843

(22) PCT Filed: Oct. 3, 2019

(86) PCT No.: PCT/AT2019/060323
§ 371 (c)(1),
(2) Date: May 18, 2021

(87) PCT Pub. No.: WO2020/102832
PCT Pub. Date: May 28, 2020

(65) Prior Publication Data
US 2022/0017999 A1    Jan. 20, 2022

(30) Foreign Application Priority Data
Nov. 19, 2018   (AT) .............................. A 50190/2018

(51) Int. Cl.
*C22C 27/04*        (2006.01)
*B22F 10/28*        (2021.01)
(Continued)

(52) U.S. Cl.
CPC .............. *B22F 10/28* (2021.01); *B22F 10/34* (2021.01); *B33Y 10/00* (2014.12); *B33Y 70/00* (2014.12);
(Continued)

(58) Field of Classification Search
None
See application file for complete search history.

(56) References Cited

U.S. PATENT DOCUMENTS 6,558,447 B1   5/2003   Shekhter et al.
9,839,907 B2   12/2017  Coupland
(Continued)

FOREIGN PATENT DOCUMENTS

CN   103074532 A   5/2013
CN   104368814 A   2/2015
(Continued)

OTHER PUBLICATIONS

Wang et al.: "Dense Pure Tungsten Fabricated by Selective Laser Melting", Applied Sciences Jul. 2017, 430, DOI:10.3390/app7040430.
(Continued)

*Primary Examiner* — Elizabeth Collister
(74) *Attorney, Agent, or Firm* — Laurence A. Greenberg; Werner H. Sterner; Ralph E. Locher

(57) ABSTRACT

A component has a solid structure that is manufactured using a laser or electron beam in an additive manufacturing process. The solid structure is formed from at least one material selected from the group consisting of molybdenum, a molybdenum-based alloy, tungsten, a tungsten-based alloy, and a molybdenum-tungsten-based alloy. The component includes one or more alloying element which at least in the temperature range ≥1500° C. has/have a reducing effect, as follows: in the case of molybdenum and the molybdenum-
(Continued)

based alloy, for $MoO_2$ and/or $MoO_3$; in the case of tungsten and the tungsten-based alloy, for $WO_2$ and/or $WO_3$; and, in the case of the molybdenum-tungsten-based alloy, for at least one oxide from the group of $MoO_2$, $MoO_3$, $WO_2$ and $WO_3$. The alloying element, or at least one of the alloying elements, is present both in at least partially unoxidized form and in oxidized form.

14 Claims, 3 Drawing Sheets

(51) Int. Cl.
| | | |
|---|---|---|
| B22F 10/34 | (2021.01) | |
| B33Y 10/00 | (2015.01) | |
| B33Y 70/00 | (2020.01) | |
| B33Y 80/00 | (2015.01) | |
| B22F 1/065 | (2022.01) | |

(52) U.S. Cl.
CPC .............. *C22C 27/04* (2013.01); *B22F 1/065* (2022.01); *B22F 2301/20* (2013.01); *B33Y 80/00* (2014.12)

(56) References Cited

U.S. PATENT DOCUMENTS

| | | | |
|---|---|---|---|
| 10,174,410 B2 | 1/2019 | Kadokura et al. | |
| 10,865,467 B2 | 12/2020 | Ott et al. | |
| 2003/0087094 A1 | 5/2003 | Smith et al. | |
| 2014/0141281 A1 | 5/2014 | Kadokura et al. | |
| 2017/0239726 A1 | 8/2017 | Palumbo et al. | |
| 2018/0056252 A1 | 5/2018 | Steele et al. | |
| 2018/0161883 A1* | 6/2018 | Stawovy | B22F 10/14 |
| 2018/0318922 A1 | 11/2018 | Angles | |
| 2020/0095696 A1 | 3/2020 | Doughty | |
| 2021/0069781 A1 | 3/2021 | Mizobe et al. | |
| 2022/0134421 A1 | 5/2022 | Angles | |

FOREIGN PATENT DOCUMENTS

| | | |
|---|---|---|
| CN | 104923783 A | 9/2015 |
| CN | 106944741 A | 7/2017 |
| CN | 107009025 A | 8/2017 |
| CN | 107245621 A | 10/2017 |
| CN | 108015445 A | 5/2018 |
| DE | 102015209583 A1 | 12/2016 |
| EP | 0190378 A1 | 8/1986 |
| JP | S63169341 A | 7/1988 |
| JP | 2002226926 A | 8/2002 |
| JP | 2014012883 A | 1/2014 |
| JP | 2018523010 A | 8/2018 |
| KR | 20180109851 A | 10/2018 |
| WO | 2012032325 A1 | 3/2012 |
| WO | 2012055398 A1 | 5/2012 |
| WO | 2015198052 A1 | 12/2015 |
| WO | 2017077137 A2 | 5/2017 |
| WO | 2019230806 A1 | 12/2019 |

OTHER PUBLICATIONS

Faidel et al.: "Investigation of the selective laser melting process with molybdenum powder", Additive Manufacturing, Aug. 2015, 88-94.

Gu et al.: "Selective Laser Melting Additive Manufacturing of Hard-to-Process Tungsten-Based Alloy Parts With Novel Crystalline Growth Morphology and Enhanced Performance", Journal of Manufacturing Science and Engineering, Aug. 2016, vol. 138 / 081003-1.

Batienkov et al.: Materials Based on Refractory Metals for Manufacturing High-Temperature Engineering Components, Metallurgist, vol. 62, Nos. 7-8, Nov. 2018 (Russian Original Nos. 7-8, Sep.-Oct. 2018).

Braun et al.: "Molybdenum and tungsten manufactured by selective laser melting: Analysis of defect structure and solidification mechanisms", International Journal of Refractory Metals & Hard Materials 84 (2019) 104999.

Leitz et al.: "Additive Manufacturing of Pore and Crack Free Molybdenum and Tungsten by Selective Laser Melting", Euro PM 2019—AM Refractory & Heavy Metals, Manuscript refereed by Dr.-Ing. Thomas Weissgaerber (Fraunhofer IFAM, Germany).

Kaserer et al.: "Fully dense and crack free molybdenum manufactured by Selective Laser Melting through alloying with carbon", International Journal of Refractory Metals & Hard Materials 84 (2019) 105000.

Lukas Kaserer et al.: "Comparison of different alloying concepts for Mo for improving component strength and quality in LPBF", Conference paper, Euro PM2023 Congress & Exhibition, Oct. 1-4, 2023, Lisbon.

* cited by examiner

ADDITIVELY MANUFACTURED REFRACTORY METAL COMPONENT, ADDITIVE MANUFACTURING PROCESS AND POWDER

BACKGROUND OF THE INVENTION

Field of the Invention

The invention relates to a component having, a solid structure manufactured using a laser or electron beam in an additive manufacturing process from at least one material selected from the following group: molybdenum, a molybdenum-based alloy, tungsten, a tungsten-based alloy, and a molybdenum-tungsten-based alloy. The invention also relates to an additive manufacturing process for producing a component comprising the steps of: providing a starting powder composed of at least one material selected from a group comprising molybdenum, a molybdenum-based alloy, tungsten, a tungsten-based alloy and a molybdenum-tungsten-based alloy, and layerwise fusing of the particles of the starting powder using a laser or electron beam. Finally, the invention relates to a use of a powder for an additive manufacturing process.

Due to their high melting point, low coefficient of thermal expansion and high thermal conductivity, molybdenum (Mo), tungsten (W) and alloys thereof are used for various high-performance applications, for example X-ray anodes, heat sinks, high-temperature heating zones, thrusters, extrusion dies, parts for injection molds, hot runner nozzles, resistance welding electrodes or components for ion implantation systems. These elements moreover have a high density, thus ensuring good shielding of electromagnetic and particle radiation. As a result of the comparatively low ductility at room temperature and the high DBTT (ductile-brittle transition temperature) the processing characteristics are disadvantageous for both machining and forming processes. Furthermore, with the exception of molybdenum-rhenium and tungsten-rhenium the weldability of these materials is poor. A large industrial scale process for producing components from these materials is the powder metallurgical production route in which the corresponding starting powders are pressed and sintered and generally subsequently subjected to forming at high temperature (temperature above DBTT).

The possibilities for geometric component design achievable with additive manufacturing processes far exceed those of conventional processes. Especially for materials such as molybdenum, tungsten and alloys thereof additive manufacturing processes are especially advantageous since compared to other metallic materials these materials are markedly more difficult to process with commonly used conventional manufacturing methods. Additive manufacturing of metallic materials usually employs powder, and less commonly also wires, as a starting material. Metallic materials have seen the establishment of several processes, such as selective laser sintering (SLS), in which powder applied layerwise is locally sintered using a laser beam, selective laser beam melting (SLM) and selective electron beam melting (SEBM), in which powder applied layerwise is locally melted, and laser metal deposition (LMD), in which a powder supplied via nozzle is melted. Additive manufacturing processes do not require machining or forming tools, thus allowing cost-efficient manufacturing of components in a low number of units. They also make it possible to realize component geometries which are producible only at great cost and complexity, if at all, with classical manufacturing processes. They moreover achieve high resource efficiency since powder particles that have not been fused or sintered together may be reused. However, the disadvantage of these processes remains the very low build rate.

It must moreover be taken into account in beam-based additive manufacturing processes that compared to conventional consolidation processes, such as casting or sintering, other metal-physical mechanisms are in effect. While it is surface and boundary grain diffusion that determine densification in the case of sintering, the mechanisms of action in processes comprising local melting and solidification at high cooling rate, such as SLM, SEBM and LMD, are different, much more complex and also not yet completely understood. Here, the wetting behavior should be mentioned, Marangoni convection, recoil effects as a result of evaporation, segregation, epitaxial grain growth, solidification time, heat flow, heat flow direction and internal stresses as a result of solidification shrinkage. Material concepts that are successful in conventional processes usually do not lead to defect-free components in beam-based additive processes.

Production of pure tungsten by selective laser beam melting is described in a journal article by Dianzheng Wang et al. (Appl. Sci. 2007, 7, 430) and production of molybdenum by selective laser beam melting in a journal article by D. Faidel et al. (Additive Manufacturing 8 (2015) 88-94). WO2012055398 discloses a selective laser melting process for refractory metals, wherein the composition of the material can be altered by reaction with a reactive gas present in the atmosphere during construction of the component. The specification CN103074532 A and the accompanying journal paper "Selective Laser Melting Additive Manufacturing of Hard-to-Process Tungsten-Based Alloy Parts With Novel Crystalline Growth Morphology and Enhanced Performance", Journal of Manufacturing Science and Engineering, August 2016, Vol. 138, 081003, Dongdong Gu et al., describes laser beam melting of mechanically alloyed tungsten-TiC powder.

The most widespread additive manufacturing process is the selective laser beam melting process (SLM). This comprises using a coating bar to apply a powder layer to a substrate. A laser beam is then guided over this powder layer. Said beam effects local melting of the powder particles, thus causing the individual powder particles to fuse to one another and to the previously applied layer. A layer of the component to be manufactured is thus formed through successive local melting of powder particles and subsequent solidification. A further powder layer is then applied to the previously processed powder layer and the process recommences. The component is thus further constructed with each new powder layer, wherein the build direction is perpendicular to the respective planes of the powder layers. Since the additive manufacturing process results in a characteristic microstructure those skilled in the art can discern whether a component has been produced by a conventional process or an additive process.

Molybdenum and tungsten have a high melting point, a high thermal conductivity in the solid phase and a high surface tension and viscosity in the liquid phase. These materials are among the most difficult materials to process using an additive manufacturing process. The short time in the molten phase caused by the high thermal conductivity, combined with the high surface tension and high viscosity, favours the balling effect, which in turn leads to pores and thus crack-inducing defects and a low density. The balling effect also has an adverse effect on surface quality, specifically on surface roughness. Since molybdenum and tungsten have a very low fracture toughness, local defects combined with the internal thermally induced stresses that are inherent to the process lead to cracks.

Components made of molybdenum and tungsten produced by selective laser or electron beam melting show a columnar crystalline structure, wherein the average grain aspect ratio (GAR; ratio of grain length to grain width) in the build direction is typically greater than 8. An intercrystalline network of cracks, which reproduces the melt path of the laser/electron beam, is formed in the plane perpendicular to the build direction. The cracks are predominantly intercrystalline hot and cold cracks. Said cracks are partially interconnected with the result that components often exhibit open porosity and are not gas- and liquid-tight. Stress resulting in fracture of the component generally does not result in plastic deformation and predominantly intercrystalline fracture behavior is observed. Intercrystalline fracture behavior is to be understood as meaning a fracture caused predominantly by cracks along the grain boundaries. As a result of this fracture behavior components produced in this way exhibit low fracture resistance, low fracture toughness and low ductility.

SUMMARY OF THE INVENTION

It is an object of the present invention to provide a component of the type in question in which the problems discussed hereinabove are avoided, an additive manufacturing process of the type in question for reliable production of a component having the abovementioned properties and a powder which exhibits optimized behavior for use in an additive manufacturing process. In particular it is an object of the invention to provide a component having the following properties:
  reduced defect frequency, in particular crack frequency
  improved fracture toughness
  improved ductility
  improved density
  closed porosity The object is achieved by a component having the features as claimed, an additive manufacturing process having the features as claimed and a use of a powder having the features as claimed. Advantageous embodiments of the invention are defined in the dependent claims.

Components made of molybdenum, tungsten, molybdenum-based and tungsten-based alloys produced via beam-based additive manufacturing processes typically have an oxygen content between 0.25 and 0.6 at %. When using mechanically alloyed powders markedly higher oxygen contents of 2 at % or more can also occur. The additive manufacturing process, for example selective laser or electron beam melting, does not reduce the oxygen content. When using high-resolution examination methods such as scanning or transmission electron microscopy it is apparent that in prior art components the oxygen is predominantly precipitated at the grain boundaries in the form of molybdenum/tungsten oxide. These precipitations are arranged areally at the grain boundaries and are responsible for the intercrystalline fracture behavior with consequently low fracture resistance and toughness of additively manufactured components made of molybdenum, tungsten and alloys thereof. The high oxygen content can result in both hot and cold cracks. Hot cracks are formed during production as a result of reduced grain boundary strength. In the present case grain boundary strength is adversely affected by the melting of the oxides precipitated at the grain boundaries in the heat-influenced zone of the melt path. Cold cracks are attributable to thermally induced stresses in combination with defects (pores, microcracks) which act as crack nuclei. When grain boundary strength is markedly lower than the strength in the grain interior, as is the case in the prior art, intercrystalline cracking occurs.

A high oxygen content additionally amplifies the balling effect. The oxygen accumulates in the edge region of the melting zone and reduces surface tension there. Marangoni convection thus promotes a material flow from the edge region into the center of the melting zone, as a result of which the balling caused by the Plateau-Rayleigh instability is even more markedly amplified.

A component according to the invention therefore has the feature that the component comprises one or more alloying elements which at least in the temperature range ≥1500° C. has/have a reducing effect in the case of molybdenum and the molybdenum-based alloy for $MoO_2$ and/or $MoO_3$, in the case of tungsten and the tungsten-based alloy for $WO_2$ and/or $WO_3$ and in the case of the molybdenum-tungsten-based alloy for at least one oxide from the group of $MoO_2$, $MoO_3$, $WO_2$ and $WO_3$, wherein the or at least one of the alloying element(s) is present both in at least partially unoxidized form and in oxidized form.

The singular term "alloying element" hereinbelow also comprises two or more alloying elements which have a reducing effect on molybdenum/or tungsten.

The alloying element may be present both in elemental form and as a component of a compound. It is noted that gases such as hydrogen are typically, and in the context of the present invention, not referred to as alloying elements. The invention additionally requires that the alloying element is present both in at least partially unoxidized form and in oxidized form. This requires that the oxidized form of the alloying element is present in the component in the solid state.

The basic concept of the invention is that of reducing the formation of molybdenum/tungsten oxides, in particular at the grain boundaries, by providing the oxygen with a more attractive reaction partner in the form of the at least one alloying element having a reducing effect. Accordingly the oxygen content of the component is not reduced but rather the oxygen is at least partially, preferably largely, present in the form of a solid oxide formed (at room temperature) with the alloying element(s). The oxygen bound in this way can no longer have an adverse effect on grain boundary strength.

Suitable alloying elements having a reducing effect may be easily found in tables by those skilled in the art. The Gibbs energy (free enthalpy) or a Richardson-Ellingham diagram may be used to find the elements having a reducing effect on molybdenum/tungsten oxide on the basis of the differences between their standard free enthalpies of formation. This makes it possible in simple fashion to find elements suitable as a reducing agent for molybdenum/tungsten oxide. The alloying element preferably has a reducing effect for all molybdenum oxides (for example $MoO_2$, $MoO_3$) and/or for all tungsten oxides (for example $WO_2$, $WO_3$) independently of their stoichiometry. In order for the alloying element to be able to reliably bind the oxygen in the form of an oxide the alloying element must have a reducing effect for molybdenum/tungsten oxide at least in the temperature range ≥1500° C. At temperatures <1500° C. the reaction kinetics are too slow and sufficient reduction of molybdenum/tungsten oxide thus no longer occurs. The alloying element preferably has a reducing effect for molybdenum/tungsten oxide in the temperature range room to liquidus temperature of the molybdenum/tungsten alloy.

The presence of the alloying element in the component in at least partially unoxidized form and in oxidized form may be demonstrated by customary methods, for example XRD, microprobe, ICP-OES, ICP-MS, XRF, SEM/EDX, TEM/EDX and carrier gas hot extraction. Quantitative determination of the alloying element content is carried out for example via ICP-OES or ICP-MS and quantitative determination of the oxygen content by carrier gas hot extraction or XRF. Whether the alloy element is present in both oxidized and non-oxidized form can be determined by XRD and at low contents by spatially resolving methods, for example microprobe, SEM/EDX or TEM/EDX.

An additive manufacturing process according to the invention has the feature that the provided starting powder comprises at least one element which at least in the temperature range ≥1500° C. has a reducing effect in the case of molybdenum and the molybdenum-based alloy for $MoO_2$ and/or $MoO_3$, in the case of tungsten and the tungsten-based alloy for $WO_2$ and/or $WO_3$ and in the case of the molybdenum-tungsten-based alloy for at least one oxide from the group of $MoO_2$, $MoO_3$, $WO_2$ and $WO_3$ and is present in the provided starting powder in at least partially unoxidized form and that in the produced component the or at least one of the alloying element(s) is at least partially in the form of oxide. The at least one alloying element may be present both in elemental form and as a component of a compound.

The employed material from which the component is manufactured is preferably a powder. All beam-based additive manufacturing processes known according to the prior art, in particular those in which a multiplicity of individual powder particles are fused together to form a solid structure by a high-energy beam, may be used in the invention.

The step of providing the starting powder may comprise spheroidization of the particles in the melt phase. Spheroidization in the melt phase achieves a high cooling rate even without additional measures due to the low particle volume. This results in a very uniform distribution of the alloying element, for example in that the alloying element is present in the Mo or W crystal lattice in forcibly dissolved form or has been precipitated in the form of ultrasmall particulates. The alloying element having a reducing effect is thus homogeneously distributed in the powder particles. The homogeneous distribution ensures that the alloying element is present and can bind the oxygen in the form of an oxide at any point in the component. Furthermore, powders spheroidized via the melt phase show very good powder takeup behavior. It is thus possible to achieve powder layers with uniform surface coverage.

The step of providing the starting powder may also comprise granulation of a raw powder to which the at least one element having a reducing effect (which is then present in the finished component in the form of an alloying element) has been added. Granulation is to be understood as meaning agglomeration and binding of finely dispersed primary particles to afford larger powder particles. Starting from a homogeneous raw powder mixture containing molybdenum and/or tungsten and the alloying element, a homogeneous granulate may be produced. Compared to a ground powder granulated powder particles exhibit good flow behavior, thus allowing application of a uniform powder layer. A high oxygen content and other impurities in the powder attributable to abraded material from the milling apparatus are also avoided.

In an additive manufacturing process according to the invention it may preferably be provided that during the fusing fine carbides, nitrates or borides smaller than 1 micrometer, which have a grain refining effect and thus increase the toughness of the processed material, are formed. They simultaneously result in a strength enhancement.

A powder for a use according to the invention in an additive manufacturing process, in particular an additive manufacturing process according to the invention, has the feature that the powder comprises one or more elements which at least in the temperature range ≥1500° C. has/have a reducing effect in the case of molybdenum and the molybdenum-based alloy for $MoO_2$ and/or $MoO_3$, in the case of tungsten and the tungsten-based alloy for $WO_2$ and/or $WO_3$ and in the case of the molybdenum-tungsten-based alloy for at least one oxide from the group of $MoO_2$, $MoO_3$, $WO_2$ and $WO_3$ and that the or at least one of the reducing element(s) (present in the component as alloying element(s)) is present in at least partially unoxidized form. The at least one reducing element may be present both in elemental form and as a component of a compound.

It is preferable when the or at least one of the reducing element(s) in the powder is at least partially dissolved in a molybdenum-rich or tungsten-rich phase, preferably to an extent of more than 50 at %.

A molybdenum-based alloy is to be understood as meaning an alloy containing at least 50 at % of molybdenum. A molybdenum-based alloy especially comprises at least 80, 90, 95 or 99 at % of molybdenum. A tungsten-based alloy contains at least 50 at % of tungsten. A tungsten-based alloy especially comprises at least 80, 90, 95 or 99 at % of tungsten. A molybdenum-tungsten alloy is to be understood as meaning an alloy which comprises a sum total of at least 50 at % of molybdenum and tungsten, in particular a sum total of at least 80, 90, 95 or 99 at % of molybdenum and tungsten. Molybdenum-tungsten alloys are a preferred embodiment in all concentration ranges.

The individual powder particles are preferably melted by means of an additive manufacturing method, it being advantageous to use SLM (selective laser beam melting) or SEBM (selective electron beam melting).

The component is preferably constructed layerwise. For example, a powder layer is applied to a baseplate by means of a coating bar. The powder layer generally has a height of 10 to 150 micrometers.

In SEBM, a defocused electron beam is initially used to sinter the powder particles to one another so as to render them conductive. The powder is then locally melted by introduction of energy (by electron beam). In SLM local melting of the powder by introduction of energy (by laser beam) may be commenced immediately.

The beam generates a linear melt path pattern having a line width of typically 30 micrometers to 200 micrometers. The laser or electron beam is guided over the powder layer. By suitable beam guiding the entire powder layer or else just part of the powder layer can be melted and subsequently solidified. The melted and solidified regions of the powder layer are part of the finished component. The unmelted powder is not a constituent of the produced component. Subsequently, a further powder layer is applied by coating bar and the laser or electron beam is again guided over this powder layer. This results in a layerwise construction and a characteristic component structure. The guiding of the electron or laser beam results in formation of a so-called scan structure in each powder layer. In addition, a typical layer structure is likewise formed in the build direction which is determined by the application of a new powder layer. Both the scan structure and the individual layers are apparent in the finished component.

The microstructure of powder particles fused selectively to form a solid structure by means of a high-energy beam (preferably a laser beam or electron beam) via an additive manufacturing method differs distinctly from a microstructure produced by means of other processes, for example thermal spraying. Thus thermal spraying comprises accelerating individual spray particles in a gas stream and flinging them onto the surface of the component to be coated. The spray particles may be in the fully or partially melted form (plasma spraying) or solid form (cold gas spraying). Layer formation occurs since the individual spray particles flatten upon impacting the component surface, adhere primarily through mechanical interaction and effect layerwise construction of the spray layer. A sheetlike layer structure is thus formed. Layers produced in such a way exhibit in a plane parallel to the build direction a grain extent perpendicular to the build direction having an average grain aspect ratio (GAR; ratio of grain length to grain width) well above 2 and thus differ distinctly from layers/components produced by selective laser or electron beam melting which in a plane parallel to the build direction likewise have an average grain aspect ratio well above 2, but with a grain extent parallel to the build direction.

In one exemplary embodiment of the component according to the invention it is provided that at least one of the alloying elements in the component is present in partially dissolved form, preferably dissolved to an extent of more than 50 at %, in a molybdenum-rich or tungsten-rich phase. This has the result that the at least one alloying element is present in an amount sufficient to allow binding of the oxygen in the form of an oxide in any region of the component during the build process. While oxygen in the form of a molybdenum and/or tungsten oxide areally occupies the grain boundaries and as described hereinabove thus markedly reduces grain boundary strength, in the component according to the invention the oxygen is present as an oxide locally bound by the at least one alloying element which does not aerially occupy the grain boundaries.

In one exemplary embodiment of the component according to the invention it is provided that at least one of the alloying elements is a metallic alloying element. This alloying element is preferably at least partially dissolvable in molybdenum and/or tungsten.

In one exemplary embodiment of the component according to the invention it is provided that at least one of the alloying elements is an element of group 2, 3 or 4 of the periodic table, preferably titanium, zirconium or hafnium. These alloying elements are characterized by a strong affinity for oxygen.

In one exemplary embodiment of the component according to the invention it is provided that the component contains an oxide having a melting point >1800° C., in particular >2600° C. Preferred oxides are $TiO_2$ (melting point: 1843° C.), $ZrO_2$ (melting point: 2715° C.) or $HfO_2$ (melting point: 2758° C.). These oxides have a low propensity for coarsening. This results not only in a grain-refining, toughness-enhancing effect but also a strength-enhancing effect in the component, in particular at high usage temperatures. Mixed oxides containing $TiO_2$, $ZrO_2$ or $HfO_2$ also exhibit the abovementioned positive effects.

In one exemplary embodiment of the component according to the invention it is provided that the content of the at least one alloying element in the component in unoxidized and oxidized form is in a range from 0.05 at % to 20 at %, preferably from 0.1 at % to 10 at %. Below 0.05 at % the effect according to the invention does not occur to a sufficient extent. Above 20 at % the strength-enhancing effect of the at least one alloying element is very pronounced and stresses in the build process are therefore reduced to a lesser extent.

In one exemplary embodiment of the component according to the invention it is provided that the content of carbon in the component is in a range from 0.05 at % to 20 at %. In the case of molybdenum the carbon is preferably present in precipitated form as $Mo_2C$ and in the case of tungsten preferably in precipitated form as $W_2C$. Both $Mo_2C$ and $W_2C$ exhibit a solubility for oxygen at temperatures occurring in the component to be manufactured during the additive manufacturing process. This too makes it possible to avoid occupation of grain boundaries with molybdenum oxide/tungsten oxide and the resulting weakening thereof. Furthermore, carbon brings about grain refining in both molybdenum and tungsten and alloys thereof through constitutional supercooling during solidification of the material melted by the energy beam. However, below 0.05 at % the effect is only weak while a level above 20 at % results in a marked consolidation which impedes reduction of thermally induced stresses.

In one exemplary embodiment of the component according to the invention it is provided that the molybdenum content, the tungsten content or the total content of molybdenum and tungsten is more than 60 at %, preferably more than 80 at %, particularly preferably more than 90 at % or 95 at %.

In one exemplary embodiment of the component according to the invention it is provided that at least in one fracture plane the component exhibits a fracture behavior having a transcrystalline proportion of more than 50%, preferably of more than 80%, particularly preferably of more than 90%, of the fracture area. Transcrystalline fracture behavior is to be understood as meaning that a fracture of the component caused by overstressing runs not along the grain boundaries but predominantly through the grains. Evaluation of the transcrystalline fracture proportion is effected by scanning electron microscopic examination of a fracture surface generated at room temperature. The area with transcrystalline fracture behavior and the area with intercrystalline fracture behavior is measured at a representative point on the fracture surface and the transcrystalline fracture proportion is determined from the ratio of the transcrystalline area to the examined total area.

In one exemplary embodiment of the component according to the invention it is provided that the component is manufactured layerwise in a build direction and preferably has an average grain extent in a plane parallel to the build direction of less than 5, preferably less than 3. In the case of stresses perpendicular to the build direction a high grain aspect ratio parallel to the build direction favors intercrystalline fracturing along the grain boundaries extending substantially in the build direction since the fracture path is short and the generated fracture area (on account of the oriented course of the grain boundaries) is thus small. By contrast, a low grain aspect ratio ensures that sufficient fracture toughness is ensured even in the case of such stresses perpendicular to the build direction. This ensures an isotropy of mechanical properties sufficient for the typically required performance characteristics.

In one exemplary embodiment of the component according to the invention it is provided that the component has a fine-grained microstructure having an average grain area of less than 10 000, in particular less than 1000, micrometers squared. The component thus has a high strength and toughness in conjunction with a high ductility. Grain area is determined by quantitative microscopy (stereology) using planimetry.

In one exemplary embodiment of the component according to the invention it is provided that the component contains fine carbide, nitride or boride particulates, preferably having an average size of less than 1 micrometer. These particulates have a strengthening and also grain-refining effect, and thus increase fracture toughness. The fine particulates are preferably carbides, nitrides or borides of the alloying element having a reducing effect.

In one exemplary embodiment of the component according to the invention it is provided that the oxidized form of the at least one alloying element in the component is in the form of fine oxide precipitations having an average size of less than 5 micrometers, preferably <1 micrometer. The oxides are preferably formed by reaction of the at least one alloying element with the oxygen in the material during the additive manufacturing process. These oxides can have a nucleating effect, as a result of which the component exhibits an advantageously fine microstructure with high strength and toughness.

In one exemplary embodiment of the component according to the invention, of the additive manufacturing process according to the invention and of the use according to the invention it is provided that in the starting powder the sum of all alloying elements having a reducing effect in at % (based on the composition of the starting powder) is at least 50% higher, preferably at least 100% higher, than an oxygen content of the starting powder in at % (based on the composition of the starting powder).

In a further exemplary embodiment of the component according to the invention, of the additive manufacturing process according to the invention and of the use according to the invention it is provided that in the component the sum of all metallic alloying elements/reducing elements in at % is at least 50% higher, preferably at least 100% higher, than an oxygen content of the component in at %.

The abovementioned ratios ensure that the content of the at least one alloying element is sufficiently high during the additive production process at any point in the component to prevent disadvantageous occupation of the grain boundaries by molybdenum or tungsten oxide.

Exemplary embodiments of the invention are discussed with reference to the figures.

DETAILED DESCRIPTION OF THE INVENTION

Prior Art Specimen (Specimen Number 1):

For a noninventive specimen spheroidized Mo powder in a sieve fraction <40 micrometers was used.

The chemical and physical powder properties are reported in table 1. With typical parameters for volume construction of molybdenum this powder was processed using a commercial SLM apparatus into specimens for microstructure characterization and determination of density having dimensions of 10 mm×10 mm×10 mm and into flexural specimens having dimensions of 35 mm×8 mm×8 mm.

Figure 1:
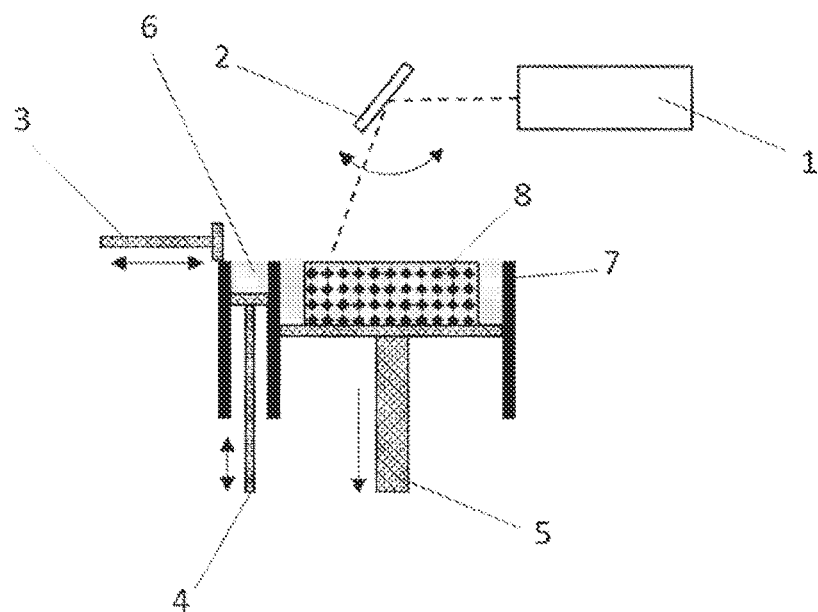
FIG. 1: Schematic representation of the SLM process

A schematic diagram of the SLM process is shown in FIG. 1. A control system controls inter alia the laser 1, the laser mirror 2, the coating bar 3, the powder feed 4 from a powder reservoir container 6 and the position of the base plate 5 in the build space 7. The system has a build space heating means. For the experiments the Mo base plate was heated to 500° C. A powder layer was applied using the coating bar 3. The laser beam guided using the laser mirror 2 scanned over the powder layer and thus melted the particles, and partially the previously melted and solidified layer therebelow, where material is present according to the component design (component 8). The base plate 5 was then lowered by 30 micrometers and the coating bar 3 applied a further powder layer and the process sequence was restarted.

The specimens were separated from the base plate 5 by wire erosion and the specimen density of the 10 mm×10 mm×10 mm specimens was determined by the buoyancy method (hydrostatic weighing), wherein open pores were closed beforehand by immersion in molten paraffin. The specimens were subjected to metallographic examination. The 35 mm×8 mm×8 mm specimens (3 parallel specimens) were subjected to a 3-point flexural test. The fracture surface of the flexural specimens was investigated by scanning electron microscopy and the proportion of intercrystalline/transrystalline fracture surface was determined.

Figure 2A:
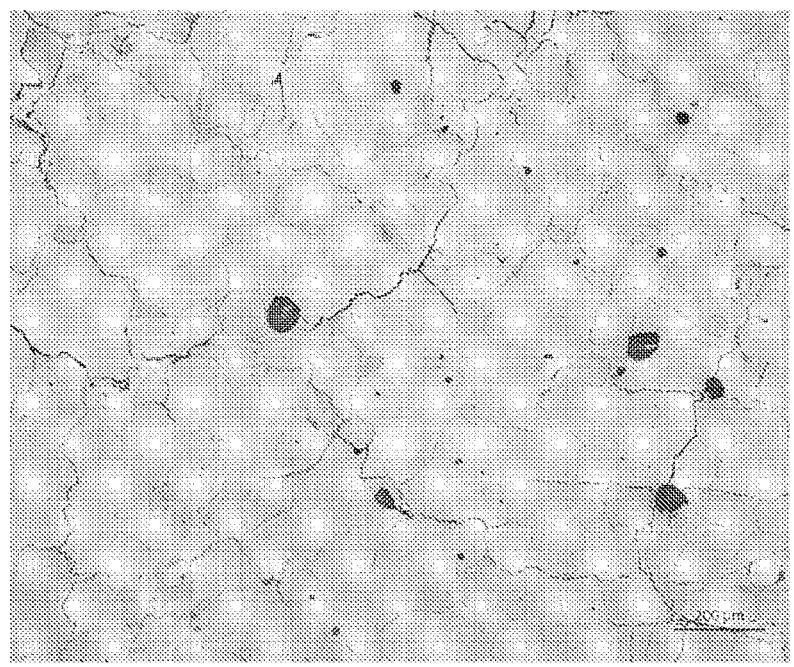
FIG. 2: Optical micrograph of a prior art Mo specimen produced by SLM (specimen number 1) having a section plane perpendicular to the build direction (FIG. 2*a*) and parallel to the build direction (FIG. 2*b*)
Figure 2B:
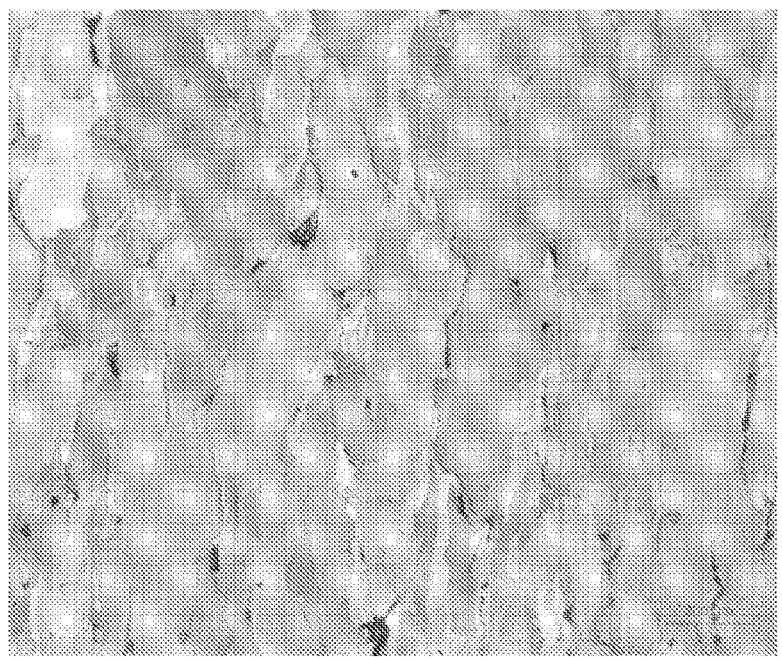
Figure 3:
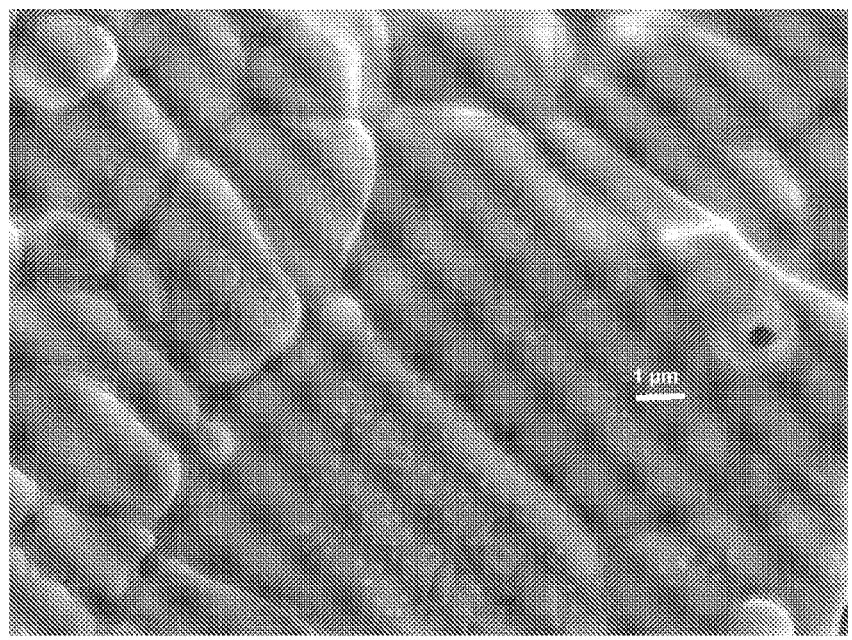
FIG. 3: Scanning electron micrograph of a prior art fracture surface (specimen number 1)

FIG. 2 shows the microstructure of the prior art Mo specimen (specimen number 1). The section plane is perpendicular to the build direction in FIG. 2*a* and parallel to the build direction in FIG. 2*b*. The specimen exhibits many pores and intercrystalline cracks arranged in a tile-like manner which reproduce the scan structure of the process. The microstructure is in the form of columnar crystals parallel to the build direction. The grain aspect ratio was determined by image analysis by determining the average grain length and the average grain width and subsequently dividing the average grain length by the average grain width. A grain aspect ratio of 8 was calculated. The flexural strength of the sample is reported in table 2. The low value is attributable to the low grain boundary strength. The proportion of intercrystalline fracture is 95%. The scanning electron microscopic examination of the fracture surface shows that the grain boundaries are areally occupied with Mo oxide precipitations (FIG. 3).

Inventive Specimens:

For the inventive specimens powders spheroidized via the melt phase (specimen numbers 2, 3 and 4) in a sieve fraction <40 micrometers were used. The chemical and physical powder properties are reported in table 1. The processing of these powders was carried out at typical parameters for volume construction of molybdenum at a build space temperature of 800° C. The specimens for microstructure characterization and determination of density had dimensions of 10 mm×10 mm×10 mm. The flexural specimens had dimensions of 35 mm×8 mm×8 mm.

The SLM process and the characterization of the specimens were performed under identical conditions as described for the prior art specimens.

Figure 4:
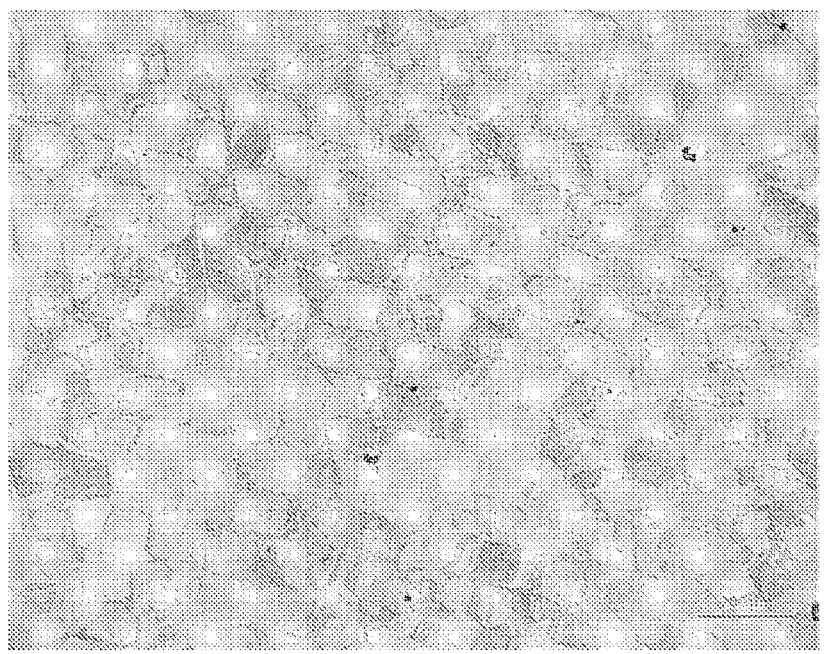
FIG. 4: Optical micrograph of an inventive specimen produced by SLM (specimen number 4) having a section plane perpendicular to the build direction

Metallographic examination of the specimen having specimen number 2 (Mo—0.55 at % Hf), the specimen having specimen number 3 (Mo—1.1 at % Zr) and the specimen having specimen number 4 (Mo—0.9 at % Ti—0.09 at % Zr—0.10 at % C) shows that all inventive specimens are crack-free as documented in exemplary fashion in FIG. 4 for the specimen having specimen number 4 via an optical micrograph (section plane perpendicular to build direction). The microstructure in a plane parallel to the build direction has an average grain aspect ratio of 3.8 (specimen having specimen number 2), 3.9 (specimen having specimen number 3) and 2.9 (specimen having specimen number 4).

The results of the chemical analysis, the flexural test and the evaluation of the fracture surface are reported in table 2.

The flexural strength of the inventive specimens is about 10 times higher than that of the prior art specimen. For all specimens the dominant fracture mechanism is transcrystalline fracture. In the specimens having specimen numbers 2 and 3 a small proportion (3%) of intercrystalline fracture surface was detected, wherein in this region the grain boundaries are oriented in the plane of the transcrystalline fracture path. Energy dispersive X-ray spectroscopy (EDX) did not detect any Mo Oxide in these regions. The specimen having specimen number 4 shows only transcrystalline fracture. XRD examinations show the phases Mo and $HfO_2$ for the specimen having specimen number 2, the phases Mo and $ZrO_2$ for the specimen having specimen number 3 and the phases Mo and $TiO_2$ for the specimen having specimen number 4. SEM/EDX examinations detected $HfO_2$ particulates in the specimen having specimen number 2, $ZrO_2$ particulates in the specimen having specimen number 3 and $TiO_2$ particulates in the specimen having specimen number 4. However, the larger volume fraction of the respective oxides was of a fineness such that the particle size was below the limit of detection of the SEM. Initial TEM examinations of the specimen having specimen number 4 detected particulates having an average size in the range of 30 nm.

TABLE 1

| | Specimen number | | | |
|---|---|---|---|---|
| | 1 | 2 | 3 | 4 |
| Chemical composition of the starting powder | O: 0.28 at % balance Mo and other impurities | Hf: 0.55 at % O: 0.29 at % balance Mo and other impurities | Zr: 1.1 at % O: 0.28 at % balance Mo and other impurities | Ti: 0.98 at % Zr: 0.09 at % C: 0.18 at % O: 0.21 at % balance Mo and other impurities |
| Particle size distribution (d10/d50/d90) | 14.5 μm 25.9 μm 45.7 μm | 13.2 μm 24.9 μm 44.1 μm | 12.5 μm 24.1 μm 42.8 μm | 12.8 μm 24.5 μm 43.6 μm |
| Poured density/tapped density | 5.5 g/cm³ 6 g/cm | 5.6 g/cm³ 6.1 g/cm | 5.2 g/cm³ 5.9 g/cm | 5.7 g/cm³ 6.2 g/cm |

TABLE 2

| | Specimen number | | | |
|---|---|---|---|---|
| | 1 | 2 | 3 | 4 |
| Chemical composition | O: 0.27 at % balance Mo and other impurities | Hf 0.55 at % O: 0.28 at % balance Mo and other impurities | Zr: 1.1 at % O: 0.29 at % balance Mo and other impurities | Ti: 0.9 at % Zr: 0.09 at % C: 0.10 at % O: 0.12 at % balance Mo and other impurities |
| Specimen density | 9.79 g/cm³ | 10.04 g/cm³ | 9.90 g/cm³ | 10.12 g/cm³ |
| 3-point flexural fracture strength (test force parallel to the build direction) | 88 N/mm² | 880 N/mm² | 850 N/mm² | 907 N/mm² |
| Proportion of transcrystalline fracture (fracture surface parallel to build direction) | 5 | 97 | 97 | 100 |

LIST OF REFERENCE NUMERALS

1 Laser
2 Laser mirror
3 Coating bar
4 Powder feed
5 Base plate
6 Powder reservoir container
7 Build space
8 Component

The invention claimed is:

1. A component, comprising:
a solid structure having the characteristics of having been manufactured with a laser beam or electron beam in an additive manufacturing process from at least one material selected from the group consisting of molybdenum, a molybdenum-based alloy, tungsten, a tungsten-based alloy, and a molybdenum-tungsten-based alloy;
said solid structure containing one or more alloying elements which have a reducing effect, at least in a temperature range $\geq 1500°$ C., for the following:
in the case of molybdenum and the molybdenum-based alloy, for $MoO_2$ and/or $MoO_3$;
in the case of tungsten and the tungsten-based alloy, for $WO_2$ and/or $WO_3$; and
in the case of the molybdenum-tungsten-based alloy, for at least one oxide selected from the group consisting of $MoO_2$, $MoO_3$, $WO_2$ and $WO_3$;
wherein at least one of said one or more alloying elements is present both in at least partially unoxidized form and in oxidized form;
said one or more alloying elements which have a reducing effect being selected to reduce the formation of molybdenum or tungsten oxides at the grain boundaries by offering oxygen a more attractive reaction partner;
wherein:
a molybdenum content, a tungsten content, or a total content of molybdenum and tungsten is more than 60 at %;
an oxygen content is at least 0.25 at %;
a content of the at least one alloying element in the component in unoxidized and oxidized form lies in a range from 0.1 and 10 at % and is at least 50% higher than the oxygen content in at %;
the oxidized form of said at least one alloying element is in the form of fine oxide precipitations having an average size of less than 5 µm;
a content of carbon in the component lies in a range from 0.05 at % to 20 at %;
the component has the characteristics of having been manufactured layer-wise in a build direction, with an average grain extent in a plane parallel to the build direction of less than 5.

2. The component according to claim 1, wherein the at least one of said one or more alloying elements is partially dissolved in a molybdenum-rich or tungsten-rich phase.

3. The component according to claim 1, wherein the at least one of said one or more alloying elements is a metallic element.

4. The component according to claim 1, wherein the at least one of said one or more alloying elements is an element of group 2, 3 or 4 of the periodic table of elements.

5. The component according to claim 4, wherein the component contains $TiO_2$, $ZrO_2$ or $HfO_2$.

6. The component according to claim 1, wherein the carbon in the component is at least partially in carbide form.

7. The component according to claim 1, wherein the component has at least one fracture plane exhibiting a fracture behavior with a transcrystalline proportion of more than 50% of a fracture area.

8. The component according to claim 1, wherein said solid structure has a fine-grained microstructure with an average grain area of less than 10,000 µm² (micrometers squared).

9. The component according to claim 1, wherein said solid structure contains fine carbide, nitride or boride particulates.

10. An additive manufacturing method for producing a component, the method comprising:
providing a starting powder of particles composed of at least one material selected from the group consisting of molybdenum, a molybdenum-based alloy, tungsten, a tungsten-based alloy, and a molybdenum-tungsten-based alloy;
providing the starting powder with at least one element which, in a temperature range $\geq 1500°$ C., has a reducing effect in the case of molybdenum and molybdenum-based alloy for $MoO_2$ and/or $MoO_3$, in the case of tungsten and tungsten-based alloy for $WO_2$ and/or $WO_3$, and in the case of molybdenum-tungsten-based alloy for at least one oxide selected from the group consisting of $MoO_2$, $MoO_3$, $WO_2$, and $WO_3$, and wherein the at least one element is present in the starting powder in at least partially unoxidized form;
layer-wise fusing the particles of the starting powder using a laser or electron beam; and
forming the component with the or at least one of the alloying elements at least partially in the form of an oxide, the at least one of the alloying elements having a reducing effect being selected to reduce the formation of molybdenum or tungsten oxides at the grain boundaries by offering oxygen a more attractive reaction partner;
wherein:
a molybdenum content, a tungsten content, or a total content of molybdenum and tungsten is more than 60 at %;
an oxygen content is at least 0.25 at %;
a content of the at least one alloying element in the component in unoxidized and oxidized form lies in a range from 0.1 and 10 at % and is at least 50% higher than the oxygen content in at %;
the oxidized form of the at least one alloying element is in the form of fine oxide precipitations having an average size of less than 5 µm;
a content of carbon in the component lies in a range from 0.05 at % to 20 at %; and
the component has the characteristics of having been manufactured layer-wise in a build direction, with an average grain extent in a plane parallel to the build direction of less than 5.

11. The method according to claim 10, which comprises providing the starting powder with a sum of all metallic reducing elements, in at %, at least 50% higher than an oxygen content of the starting powder, in at %.

12. A powder for an additive manufacturing process producing a component including a molybdenum content, a tungsten content, or a total content of molybdenum and tungsten is more than 60 at %, an oxygen content that is at least 0.25 at %, at least one alloying element with a content in unoxidized and oxidized form in a range from 0.1 and 10 at % and that is at least 50% higher than the oxygen content in at %, the oxidized form of said at least one alloying element is in the form of fine oxide precipitations having an average size of less than 5 µm, and a content of carbon in a range from 0.05 at % to 20 at %, and having the characteristics of having been manufactured layer-wise in a build direction, with an average grain extent in a plane parallel to the build direction of less than 5, the powder comprising:

powder particles formed via granulation and/or melt phase;

the powder particles including at least one material selected from the group consisting of molybdenum, a molybdenum-based alloy, tungsten, a tungsten-based alloy, and a molybdenum-tungsten-based alloy;

one or more reducing elements which, at least in the temperature range $\geq 1500°$ C., have a reducing effect in the case of molybdenum and the molybdenum-based alloy for $MoO_2$ and/or $MoO_3$, in the case of tungsten and the tungsten-based alloy for $WO_2$ and/or $WO_3$ and in the case of the molybdenum-tungsten-based alloy for at least one oxide selected from the group consisting of $MoO_2$, $MoO_3$, $WO_2$, and $WO_3$; and at least one of said one or more reducing elements being present in at least partially unoxidized form in the powder, said at least one or more reducing elements selected to reduce the formation of molybdenum or tungsten oxides at the grain boundaries by offering oxygen a more attractive reaction partner.

13. The powder according to claim 12, wherein at least one of said one or more reducing elements in the powder is at least partially dissolved in a molybdenum-rich or tungsten-rich phase.

14. The powder according to claim 12, wherein a sum of all metallic reducing elements in at % is at least 50% higher than an oxygen content of the component in at %.

* * * * *